US011374965B2

(12) United States Patent
Sathe et al.

(10) Patent No.: US 11,374,965 B2
(45) Date of Patent: Jun. 28, 2022

(54) METHOD AND SYSTEM FOR DOS DETECTION, MITIGATION AND NOTIFICATION

(71) Applicant: Hewlett Packard Enterprise Development LP, Houston, TX (US)

(72) Inventors: Tejas Sathe, San Jose, CA (US); Wei Hu, San Jose, CA (US); Shubham Saloni, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 169 days.

(21) Appl. No.: 16/936,981

(22) Filed: Jul. 23, 2020

(65) Prior Publication Data

US 2022/0030026 A1     Jan. 27, 2022

(51) Int. Cl.
*H04L 9/40* (2022.01)
*H04W 12/122* (2021.01)

(52) U.S. Cl.
CPC ...... *H04L 63/1458* (2013.01); *H04L 63/1483* (2013.01); *H04W 12/122* (2021.01); *H04L 2463/141* (2013.01)

(58) Field of Classification Search
CPC ............ H04L 63/1458; H04L 63/1483; H04L 2463/141; H04W 12/122
See application file for complete search history.

(56) References Cited

U.S. PATENT DOCUMENTS

| 10,966,277 | B1 * | 3/2021 | Shukla | H04W 12/12 |
| 2007/0218875 | A1 * | 9/2007 | Calhoun | H04L 63/126 455/411 |
| 2008/0022011 | A1 * | 1/2008 | Tang | H04W 60/06 709/236 |
| 2009/0300188 | A1 * | 12/2009 | Koga | H04W 76/38 709/227 |

* cited by examiner

*Primary Examiner* — Alexander Lagor
*Assistant Examiner* — Forrest L Carey
(74) *Attorney, Agent, or Firm* — Jaffery Watson Mendonsa & Hamilton

(57) ABSTRACT

A method for processing a denial of service (DOS) includes: receiving a de-authentication/disassociation (D/D) frame by an access point (AP), determining by the AP a state of security association establishment between the AP and a client device, maintaining a connection between the AP and the client device if the security association is incomplete, sending a probe packet from the AP to the client device if security association is complete and the connection between the AP and the client device is in a non-PMF (protected management frames) setting, maintaining the connection if the client device responds to the probe packet, and terminating the connection if the client device does not respond to the probe packet.

20 Claims, 5 Drawing Sheets

METHOD AND SYSTEM FOR DOS DETECTION, MITIGATION AND NOTIFICATION

BACKGROUND

This disclosure is directed to communications between access point(s) and client device(s) and more specifically to reliably shielding an access point (AP) against spurious de-authentication/disassociation frames.

SUMMARY

According to an example embodiment, a method for processing a denial of service (DOS) attack is disclosed. The method comprises: receiving a de-authentication/disassociation (D/D) frame by an access point (AP); determining, by the AP, a state of security association establishment between the AP and a client device; maintaining a connection between the AP and the client device if the security association is incomplete; sending a probe packet from the AP to the client device if security association is complete and the connection between the AP and the client device is in a non-PMF (protected management frames) setting wherein the connection is maintained if the client device responds to the probe packet; and terminated if the client device does not respond to the probe packet.

According to another example embodiment, a network device is disclosed. The network device comprises a processor which, in response to reception of a de-authentication/disassociation (D/D) frame: determines a state of security association establishment between the network device and a client device connected to the network device; maintains the connection if the security association is incomplete; sends a probe packet to the client device if security association is complete and the connection between the network device and the client device is in a non-PMF (protected management frames) setting; maintains the connection if the client device responds to the probe packet; and terminates the connection if the client device does not respond to the probe packet.

According to a further example embodiment, a non-transitory computer readable storage medium is disclosed. The non-transitory computer readable storage medium stores instruction that, when executed by a processor of a network device, in response to reception of a D/D frame, causes the processor to: determine a state of security association establishment between the network device and a client device connected to the network device; maintain the connection if the security association is incomplete; send a probe packet to the client device if security association is complete and the connection between the network device and the client device is in a non-PMF (protected management frames) setting; maintain the connection if the client device responds to the probe packet; and terminate the connection if the client device does not respond to the probe packet.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings.

DETAILED DESCRIPTION

A communications network can include access points whereby client devices can access the network through the access points. The client devices may then access resources on the network, other client devices and/or other networks such as the internet.

Figure 1:
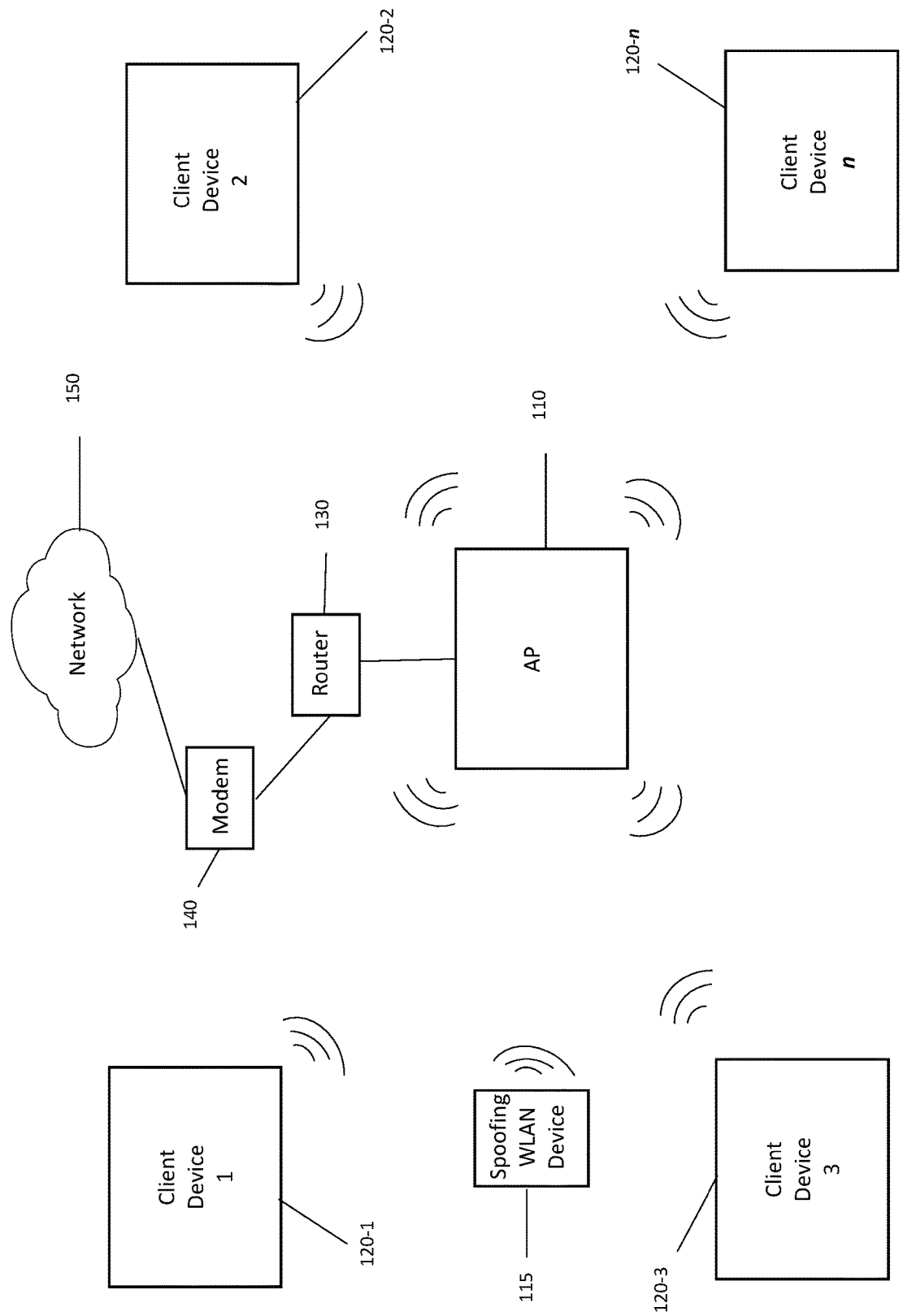
FIG. 1 illustrates an example of a network including an access point connected to a plurality of client devices.

An example of a communication network is illustrated in FIG. 1. Network 100 can include an access point 110 connected via a router 130 and a modem 140 to a network 150. The router and modem can be separate devices or their functionality can be incorporated into one physical device. The network can be the internet for example.

Network 100 can also include one or more client devices 120-1, 120-2, 120-3, . . . , 120-*n* connected wirelessly to access point 110. Client devices 120-1-120-*n* can be a computer, a portable computing device (e.g. a tablet), a mobile phone, a printer or other devices/peripherals that can communicate over a wireless medium to the access point.

A de-authentication/disassociation (D/D) frame based Denial of Service (DOS) attack can be sent to wireless access point by an attacker, such as spoofing WLAN device 115 of FIG. 1, using a spoofed address of a client as the source address. Such an attack can result in disconnection of the client from the access point. An attacker could launch an attack based on unencrypted D/D which is easily discoverable by a WLAN based sniffing device. Even with 802.11w standard, before the security association, an attack can still be launched based on unencrypted D/D frames.

A solution is desirable for recognizing the validity of received D/D frames. A valid frame can be processed to terminate the connection between a client device and an access point while an invalid frame can be ignored and the connection maintained between a client device and an access point.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the exemplary embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

Figure 2:
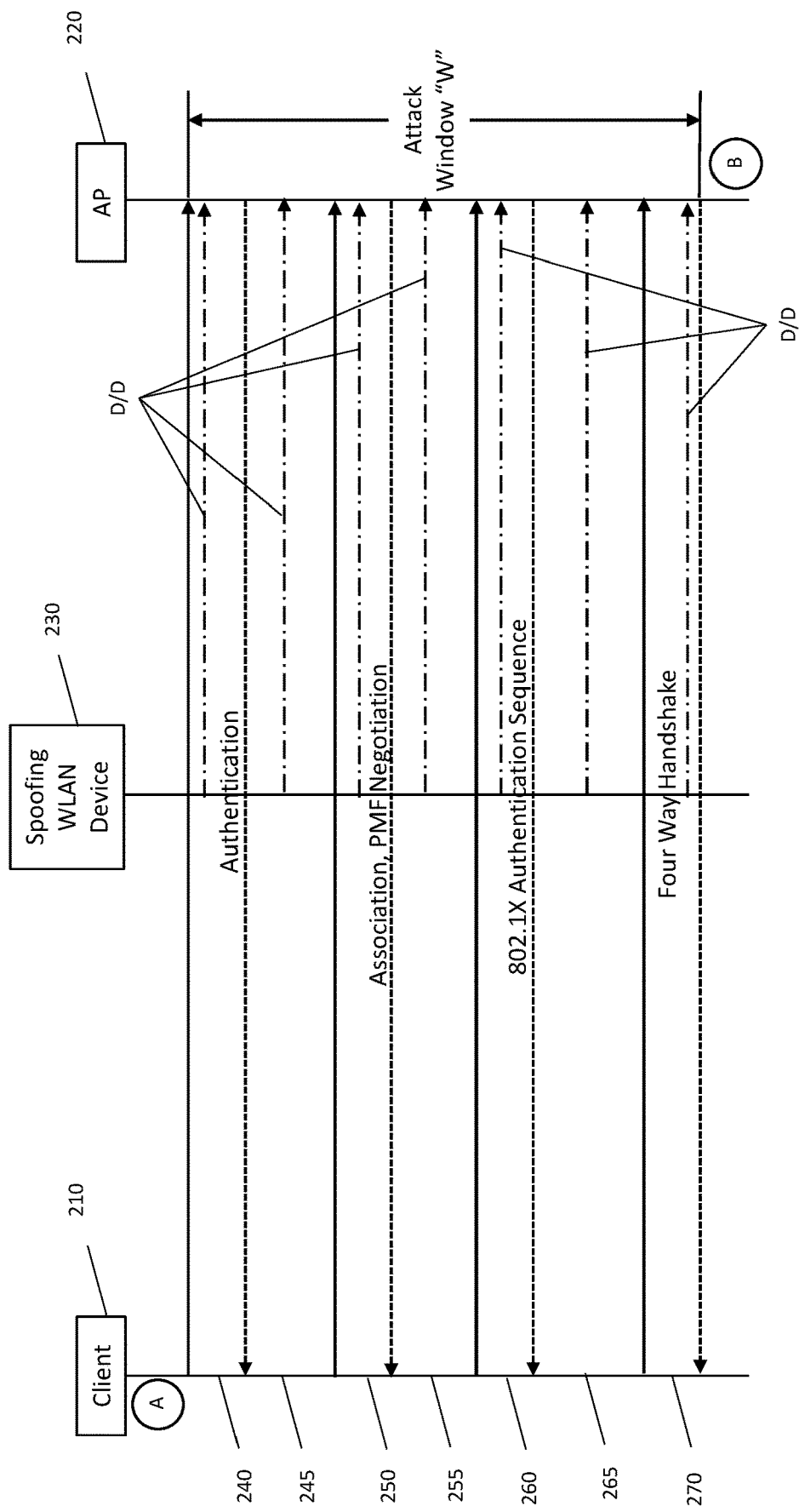
FIG. 2 illustrates an example of a security association establishment between a client device and an access point.

As illustrated in FIG. 2, a client 210 and an access point 220 engage in a process 200 known as a four-way (4-way) handshake prior to exchanging data. Encryption keys, generated during this process, are used to encrypt data sent over the wireless medium. The process starts at "A" and ends at "B". Beyond this point, the connection may be considered to be a robust (or secure) connection. Subsequent non-EAPoL (extensible authentication protocol over LAN) data frames or robust management communications are encrypted.

Under 802.11w Protected Management Frames (PMF) standard, encryption is mandated for management frames including D/D frames. An attacker cannot (easily) spoof a D/D frame in such a case.

However, even in a 802.11w setting, there exists a window of opportunity during the 4-way handshake process for rogue sources to spoof (a "spoofer") a client device address to generate/transmit spurious D/D frames. With reference to FIG. 2, this window of opportunity "W" exists between points "A" and "B". The attack window is between the reception of an initial AUTHENTICATION frame from client 210 and a last message M4 which marks the completion of the 4-way handshake.

A rogue entity 230 can generate and transmit D/D frames to access point 220 in one or more of the time slots 240-270 (which together form W) as illustrated by the dash-dot lines. Communication from client 210 to AP 220 is illustrated by a solid line and communication from AP 220 to client 210 is illustrated by a dashed line.

According to example embodiments of the present disclosure, AP 220 distinguishes between the sources of the D/D frames. If a D/D frame is received during establishment of security association (i.e. 4-way handshake) between a client device and an access point, the frame may be ignored (i.e. the frame may not be processed). Referring to FIG. 2, if the D/D frame is received during window "W", the frame may not be processed.

If the D/D frame is valid, it indicates that a client has left the basic service set (BSS) and is no longer available to communicate with the access point. The timeouts that are part of each subsequent packets communicated between the AP and the client device during the security association establishment process will abort and cleanup the client node at the AP.

If the D/D frame is not valid (i.e. using a spoofed source address), since the communication between AP and client device is "active" (i.e. still in the 4-way handshake process), the client device continues to respond to frames from the AP by not processing the spoofed D/D frame. In such a case, the received D/D frame can be flagged as being from a spoofed address. As such, a D/D based DOS attack is detected.

In both cases (i.e. valid and spoofed D/D frames being received during the 4-way handshake process), despite the AP being under attack, the client can successfully establish security association. Subsequent to the establishment of the security association, if the PMF standard is in effect (i.e. 802.11w), it (PMF) ensures robustness of the connection.

In a non-PMF setting (i.e. where management frames are not encrypted after the security association establishment), subsequent to the 4-way handshake, a DOS attack has to be detected and mitigated.

Upon receiving a D/D frame, the AP may send a probe packet (e.g. RTS or a request to send) to a client device to determine whether the client device is still associated with the AP or has left the BSS. If the received D/D frame is genuine, the client is no longer associated with the AP and a no response will be received from the client device. The probe packet will timeout.

If the received D/D frame is from a spoofed address, the client will respond to the probe packet (e.g. CTS or a clear to send) which indicates that the client is still associated with the AP and the received D/D frame is flagged as being from a spoofed address. This indicates that the AP is under attack and an attack is detected.

Figure 3:
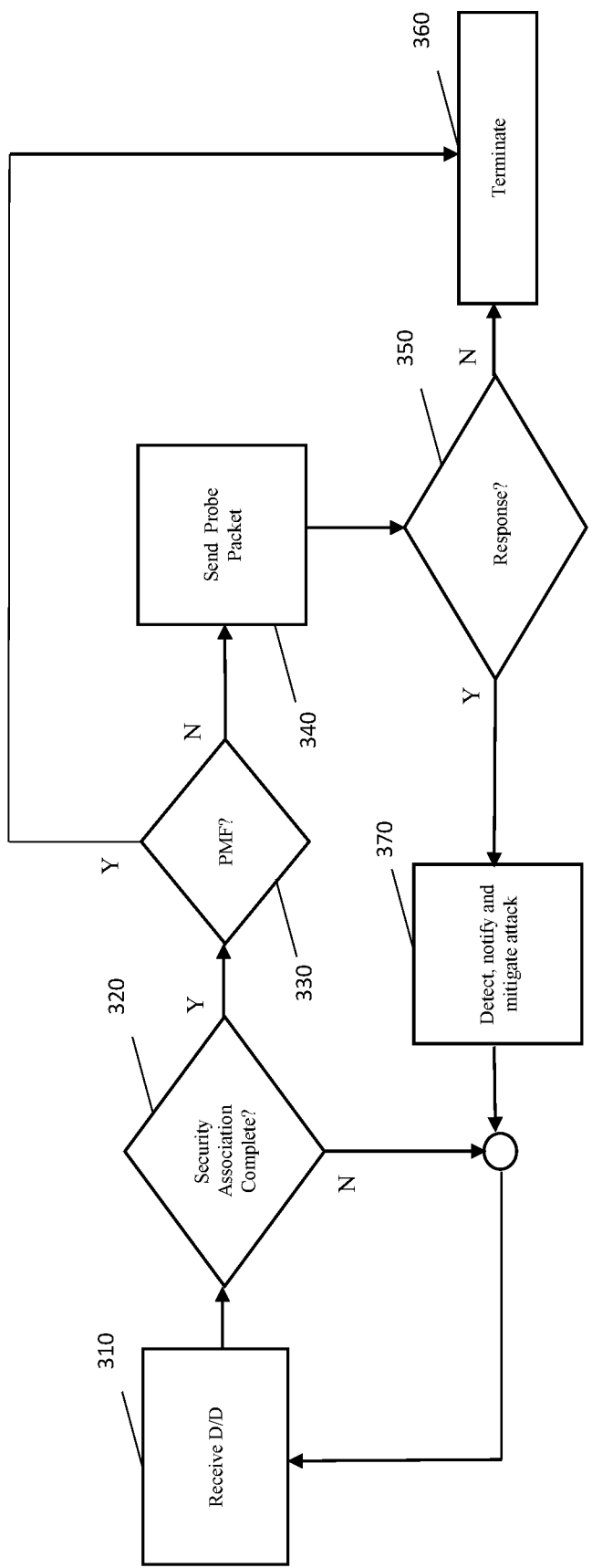
FIG. 3 illustrates a flow chart of an example embodiment for processing Deauthorization/Disassociation frames.

A method in accordance with example embodiments of the present disclosure is illustrated in FIG. 3. In method 300, a D/D frame may be received at step 310. A determination may be made at step 320 as to whether a security association has been established (i.e. 4-way handshake) between a client device and an access point. If the security association has not been established, no action is taken or the access point may await the reception of a subsequent D/D frame (at step 310). The D/D frame is ignored (i.e. not processed) regardless of whether the received frame is from a valid source or from a spoofing entity.

If the security association has been established, a determination may be made as to whether the PMF standard is in force at step 330. If PMF is in force, the management frames may be encrypted and the received D/D frame is considered to be from a valid source (i.e. client device). The connection between the client device and access point may be terminated at step 360 as a result. If PMF is not in force, then a probe packet may be sent to the client device at step 340.

A determination may be made at step 350 as to whether a response has been received (to the probe packet) by the access point. If a response has been received, then the received D/D frame is determined to be from a spoofed address. In such a case, the attack is detected, notified and mitigated at step 370 as described in further detail below (in the description of FIG. 4). The access point may then await for reception of a subsequent D/D frame (step 310).

If a response has not been received, the received D/D frame is determined to be from a valid source (i.e. from a client device) and the connection between the client device and access point may be terminated at step 360.

Figure 4:
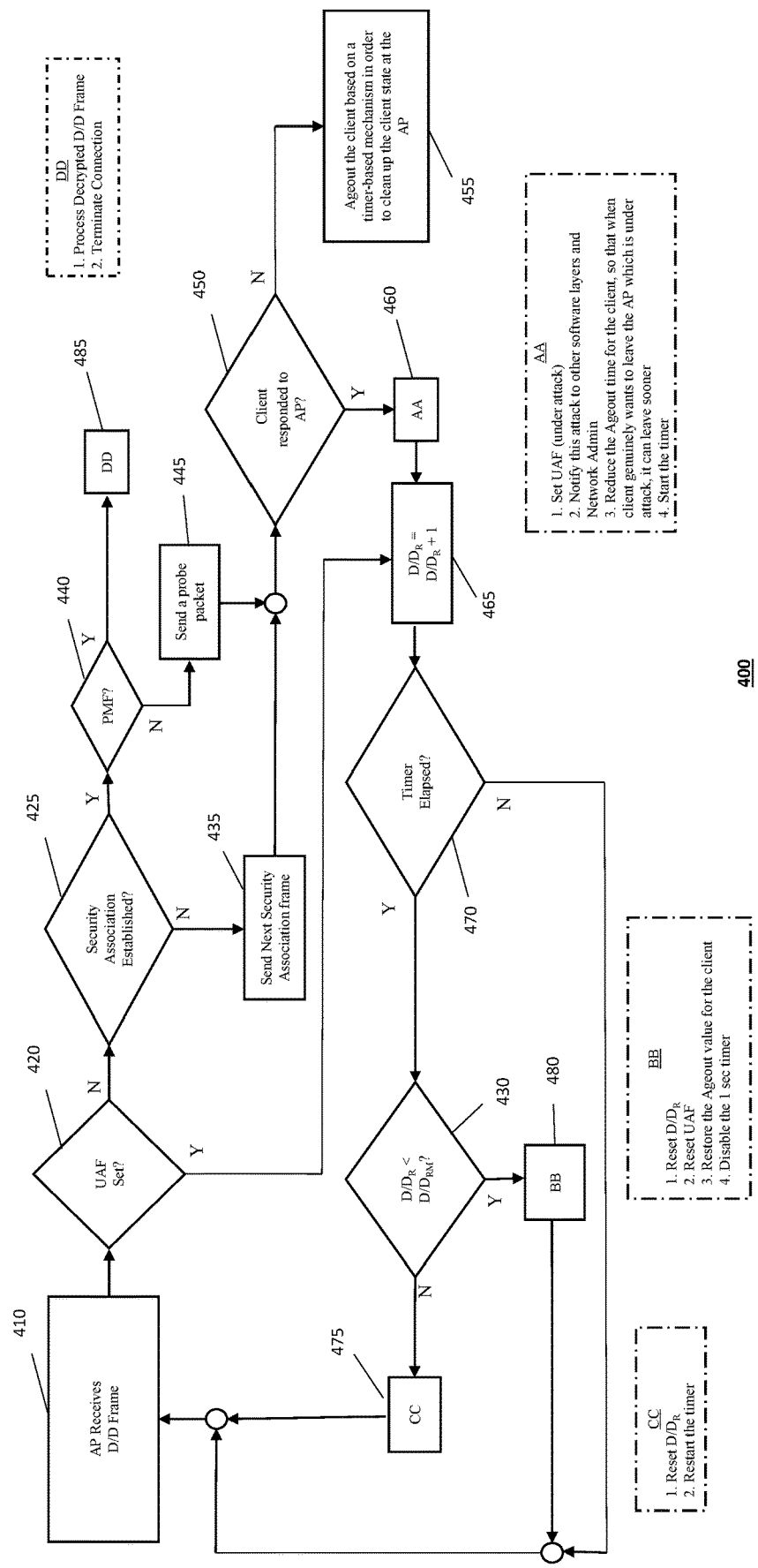
FIG. 4 illustrates a flow chart of another example embodiment for processing Deauthorization/Disassociation frames.

Another example embodiment of the present disclosure may be described with reference to FIG. 4. For simplicity, steps 460, 480, 475 and 485 are designated as AA, BB, CC and DD respectively. The functionality associated with each of these steps is elaborated in corresponding boxes with dashed lines.

An access point may a receive a D/D frame at step 410. A determination may be made as to whether an under attack flag, UAF is set at step 420 (At an initial state, that is when a first D/D frame is received, the UAF is not set). The flag may have been set earlier as described below. If the UAF is not set, a determination may be made as to whether the security association between the access point and a client device has been established at step 425. The lack of a security association establishment may indicate that the association between the access point and a client device is still in progress. The D/D frame is ignored (or, not processed) and the next frame in security association establishment may be sent at step 435.

If the security has been established as determined at step 425, a determination is made as to whether the communication between the access point and a client device is taking place under the protected management frames (PMF) standard at step 440. If the PMF standard is applicable, then the received D/D frame may be considered to be from a valid client address as management frames are encrypted under the PMF standard. In this case, the received encrypted D/D frame may be processed and communication between the client device and the AP may be terminated at step 485.

If the standard is not applicable as determined at step 440, the validity of the received D/D has to be evaluated. Such evaluation may include sending a probe packet from the access point to a client device at step 445. A determination may be made at step 450 as to whether a client responds to the probe packet sent from step 445 or to the next frame in security establishment sent from step 435. The probe packet may include a Request To Send (RTS) frame with a small duration (such as 50 microseconds for example). The probe packet is intended to check if the client is still associated with the access point or has left the basic service set (BSS).

An AP cannot send a class 3 frame after the reception of a D/D frame (genuine or spoofed) because it is not permitted. Only class 1 or class 2 can be sent in such cases. Since RTS is a class 1 frame and solicits a response, a RTS/CTS (Clear To Send) is utilized.

If the client does not respond to the AP, the client may be aged out at step 455 as described above. Lack of response from the client device indicates that the received D/D frame is a valid frame. If the client responds with a Clear To Send (CTS), it is an indication that the received D/D frame is from an invalid source (i.e. using a spoofed address) and that an attack has taken place. If no CTS is received from the client after multiple retry attempts with RTS are made, the client is aged out.

A UAF is set at step 460 in response to the reception of the invalid D/D frame. In some embodiments, at step 460, a notification of a D/D frame-based DOS attack may also be communicated to other software layers and to a network administrator. Other software layers may include those that deal with configuration, station management, AP monitoring, etc. In addition, an age-out time for the client may be reduced at step 460 so that when the client wants to leave an AP under attack, it can do so sooner. Furthermore, at step 460, a timer may be armed or started. The timer duration may be one (1) second for example.

Upon determining that the received D/D frame is from a spoofed address (at 460), a counter, $D/D_R$, may be incremented at step 465. The $D/D_R$ counter may represent the number of D/D frames received by the AP. Counter $D/D_R$ may include both genuine and spoofed frames.

Referring to step 420, if the UAF is determined to be set, the counter $D/D_R$ may also be incremented at 465. At step 470, a determination may be made as to whether the timer (having the one second duration set at 460 for example) has elapsed. If the timer has not elapsed, the method proceeds to step 410. If the timer duration has elapsed, a determination is made as to whether the $D/D_R$ is less than $D/D_{RM}$ at step 430. The $D/D_{RM}$ value may be a pre-set threshold number such as fifty (50) for example. $D/D_{RM}$ may represent a number of D/D frames permissible to be received ($D/D_R$) within the time set by the timer.

The purpose of the timer is to avoid the need for sending probe packets for every incoming D/D frame while the UAF is already set to "True" and the timer is running. The ageout values are restored to pre-set values upon the expiration of the timer after the UAF is set to "False" (the ageout values were modified at step 460). As seen at step 460, the timer is started upon setting the UAF to "True". The counter $D/D_R$ is incremented for each D/D frame received while the UAF is set until the expiration of the timer. The need for sending a probe packet for each received D/D frame is obviated (i.e. steps 410, 420, 465 and 470). Upon expiration of the timer, depending on the value of $D/D_R$, either the timer may be restarted or it is disarmed/disabled and the ageout values are restored to pre-set values (The ageout values were modified at step 460 and restored at step 480).

Referring to step 430, if $D/D_R$ is less than $D/D_{RM}$, the access point resets the UAF and $D/D_R$ at step 480. The timer is disarmed (i.e. it is reset to zero and disabled). The ageout value is also restored to pre-set value for a client.

If $D/D_R$ is not less than $D/D_{RM}$, $D/D_R$ is reset and the timer is restarted at step 475. The method proceeds to step 410.

Figure 5:
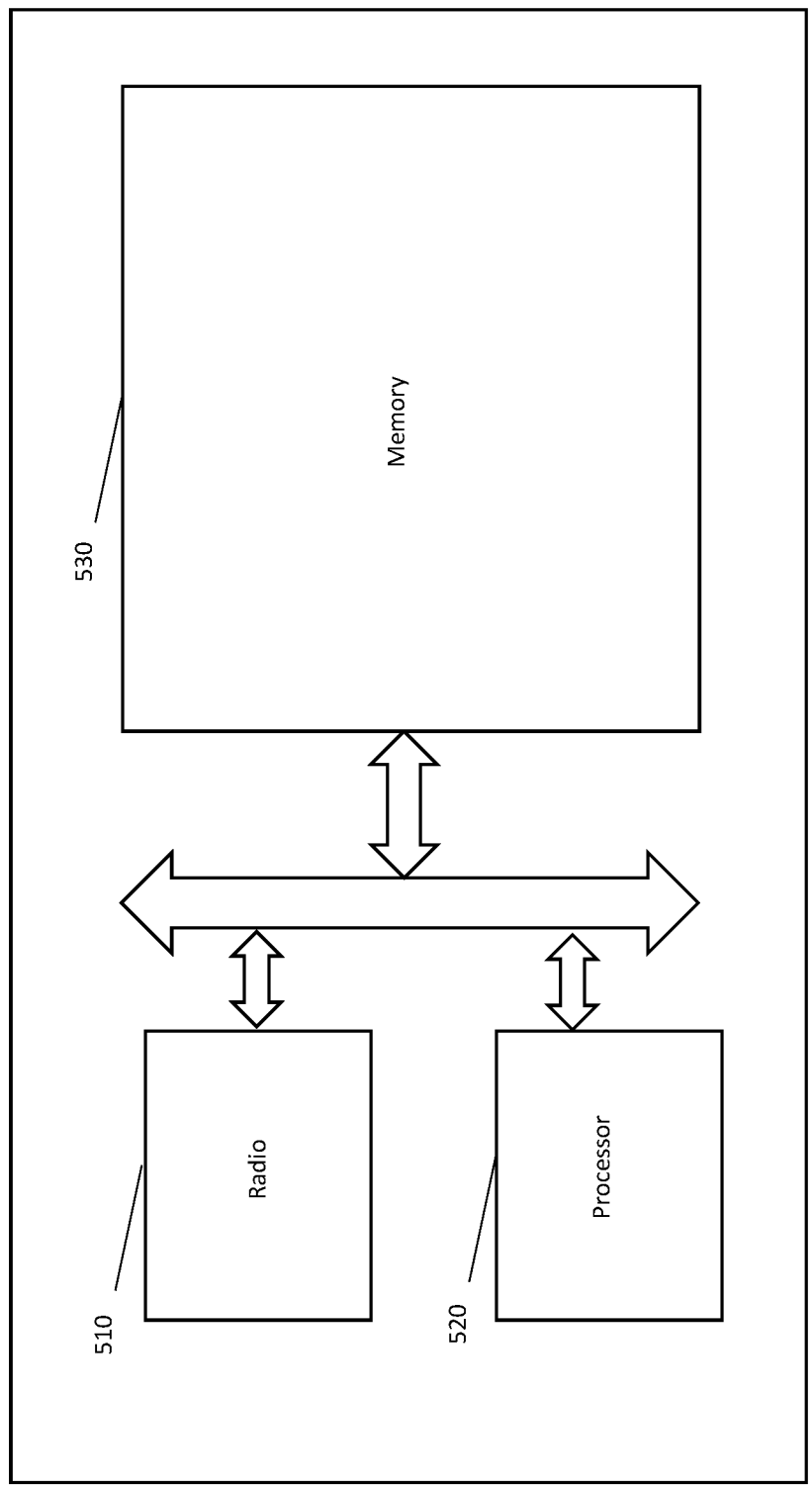
FIG. 5 is a block diagram illustrating an example wireless network device shown in FIG. 1 according to the present disclosure.

FIG. 5 is a block diagram illustrating an example wireless device, e.g., the network device 500 such as an AP 110, shown in FIG. 1 according to present disclosure.

The network device 500 includes a radio 510, a processor 520 and a non-transitory computer readable storage medium 530.

The non-transitory computer readable storage medium 530 stores instructions executable for the processor 520. In response to receiving a D/D frame via radio 510, the instructions, when executed by the processor 520, cause the processor to determine a state of security association establishment between the AP and a client device connected to the AP and maintain a connection if the security association is incomplete.

The instructions also cause the processor 520 to send a probe packet (via radio 510) from the AP to the client device if security association is complete and the connection between the AP and the client device is in a non-PMF (protected management frames) setting. The instructions further cause the processor 520 to maintain the connection if the client device responds to the probe packet or terminate the connection if the client device does not respond to the probe packet.

The example embodiments of the disclosure describe D/D frames being received at the AP. The methods described above are equally applicable where the D/D frames are received at the client device.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for processing a denial of service (DOS) attack in a wireless local access network (WLAN), the method comprising:
   in response to receiving a de-authentication/disassociation (D/D) frame by an access point (AP):
      determining, by the AP, a state of security association establishment between the AP and a client device;
      maintaining a connection between the AP and the client device if the security association is incomplete; and
      sending a probe packet from the AP to the client device if security association is complete and the connection between the AP and the client device is in a non-PMF (protected management frames) setting wherein the connection is:
      maintained if the client device responds to the probe packet; and
      terminated if the client device does not respond to the probe packet.

2. The method of claim 1, wherein maintaining the connection between the AP and the client device while the security association is incomplete comprises:
   not processing the D/D frames received by the AP.

3. The method of claim 2, wherein the frames received by the AP are sent from a client device or a spoofing device.

4. The method of claim 2, further comprising:
   sending a next security association frame to the client device.

5. The method of claim 1, wherein maintaining the connection if the client device responds to the probe packet further comprises:
   setting an under attack flag (UAF).

6. The method of claim 5, further comprising:
notifying a network administrator of the UAF being set.

7. The method of claim 5, further comprising:
notifying other software layers within the network of the UAF being set.

8. The method of claim 7, wherein the other software layers involve at least one of:
configuration of the network, station management and AP monitoring.

9. The method of claim 5, further comprising:
incrementing a counter for a number of received D/D frames.

10. The method of claim 5, further comprising:
determining the state of security association establishment between the AP and a client device if the under attack flag is not set.

11. A non-transitory computer readable storage medium storing instructions that when executed by a processor of a network device, causes the processor to:
in response to reception of a de-authentication/disassociation (D/D) frame:
determine a state of security association establishment between the network device and a client device connected to the network device;
maintain a connection between the network device and a client device if the security association is incomplete;
send a probe packet to the client device if security association is complete and the connection between the network device and the client device is in a non-PMF (protected management frames) setting;
maintain the connection if the client device responds to the probe packet; and
terminate the connection if the client device does not respond to the probe packet.

12. The non-transitory computer readable storage medium of claim 11, wherein the instructions further cause the processor to:
not process the received frame if the security association is incomplete.

13. The non-transitory computer readable storage medium of claim 11, wherein the instructions further cause the processor to:
send a next security association frame to the client device if the security association establishment is incomplete.

14. The non-transitory computer readable storage medium of claim 11, wherein the instructions further cause the processor to:
process the received frame if the client device does not respond to the probe packet.

15. The non-transitory computer readable storage medium of claim 11, wherein the instructions further cause the processor to:
decrypt the received frame.

16. The non-transitory computer readable storage medium of claim 11, wherein the instructions further cause the processor to:
set an under attack flag if the client responds to the probe packet.

17. A network device comprising a processor configured to:
in response to reception of a de-authentication/disassociation (D/D) frame:
determine a state of security association establishment between the network device and a client device connected to the network device;
maintain the connection if the security association is incomplete;
send a probe packet to the client device if security association is complete and the connection between the network device and the client device is in a non-PMF (protected management frames) setting;
maintain the connection if the client device responds to the probe packet; and
terminate the connection if the client device does not respond to the probe packet.

18. The network device of claim 17, wherein the processor:
sets an under attack flag if the client responds to the probe packet.

19. The network device of claim 18, wherein the processor:
increments a counter representing a number of received D/D frames.

20. The network device of claim 17, wherein the processor:
sends a Request To Send (RTS) as the probe packet.

* * * * *